March 6, 1962     L. F. STAUDER     3,024,374
LINEAR RATE GENERATOR
Filed Oct. 7, 1957
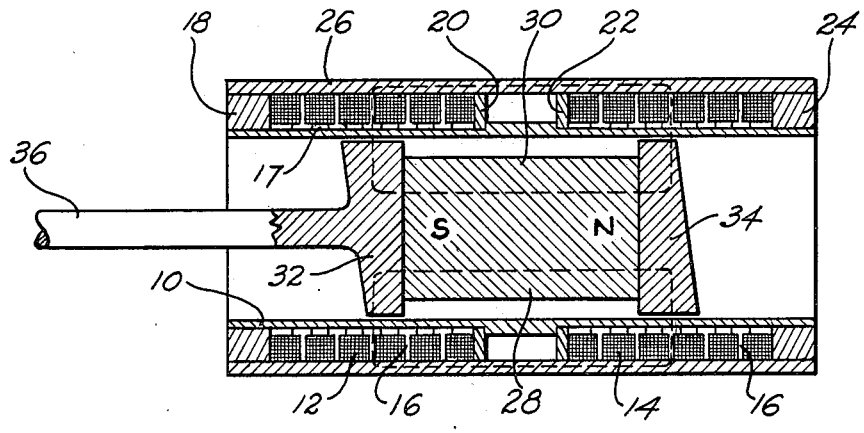
FIG_1
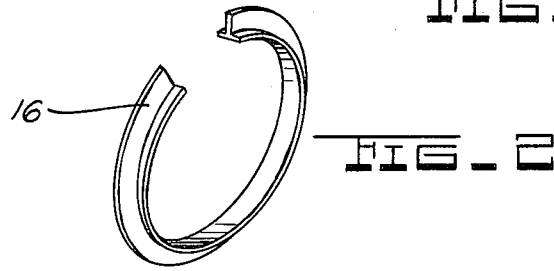
FIG_2
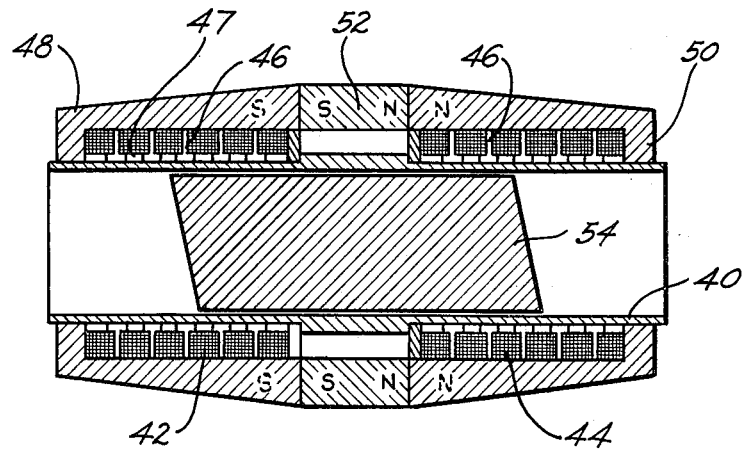
FIG_3
INVENTOR.
LAWRENCE STAUDER
BY
*Robert Smith*
ATTORNEY.

United States Patent Office 3,024,374
Patented Mar. 6, 1962

3,024,374
LINEAR RATE GENERATOR
Lawrence F. Stauder, South Bend, Ind., assignor to The Bendix Corporation, a corporation of Delaware
Filed Oct. 7, 1957, Ser. No. 688,630
6 Claims. (Cl. 310—15)

This invention relates to voltage generating devices and more particularly to a device wherein the generation of electrical voltages is a function of a linear velocity.

In the design and construction of electrically controlled servo mechanisms it sometimes becomes necessary that the linear travel of a particular member be regulated within extremely close limits. To accomplish this regulation, some means of damping must be provided to prevent the controlled member from oscillating or hunting about the optimum position. One device for accomplishing this result is a linear rate generator disclosed in copending application Serial No. 389,293, now Patent No. 2,842,688, filed in the name of Lyle Martin (common assignee). The present invention is concerned with an improvement on the design described in said application. The novel features of the present design also improve the performance and the ease of manufacture of the signal generator portion of many indicating and recording devices, such as the seismograph. In the case of a hydraulic integrator the observed magnitude of the rate generator output in relation to the forcing function of the input to the hydraulic integrator yields information from which the frequency response of the hydraulic integrator can be determined. This invention is therefore applicable to the design of any linear generator used in control, indicating and recording devices generally.

It is an object of the present invention to provide a means for generating an electrical signal having a desired characteristic from a linear motion.

It is another object of the present invention to provide an electrical generator capable of producing a voltage which varies essentially linearly with changes in rate of travel of its prime mover.

It is another object of the present invention to produce a device which will accomplish the above objectives with a minimum of volume and weight of materials while retaining or increasing simplicity, ruggedness of design, and ease of manufacture.

Other objects and advantages will become apparent from the following specification in which:

FIGURE 1 is a sectional view of an elementary form of my invention;

FIGURE 2 is a perspective view partly in section of an annular member of the type used in the device of FIGURE 1; and FIGURE 3 is a sectional view of an alternate form of my invention.

Referring now to FIGURE 1, my linear rate generator includes a cylindrical coil form member 10 of non-magnetic material upon which is wound a pair of windings or coils 12, 14. Interspersed at intervals between the individual turns of said windings are a plurality of washer like members or "teeth" 16 of magnetic material which are shown as T-shaped in cross-section but which may be L or I-shaped or formed in any other configuration which may prove to be appropriate for a given application. Interspersed between these "teeth" are annular spacer members 17 which are of non-magnetic material. A plurality of annular coil retaining members 18, 20, 22, 24 are positioned at the ends of the individual windings 12 and 14. These annular retainers are preferably of magnetic material. Enclosing the coil form member 10, the windings 12 and 14, and in contact with the spacer member 16 and the retainer members 18, 20, 22 and 24 is a cylindrical housing member 26 of magnetic material. Positioned within the hollow interior of the coil form member 10 is a spool member 28 consisting of a permanent magnet 30 and a pair of pole pieces 32, 34 of magnetic material. The spool member 28 may be moved axially by means (not shown) which drives the attached shaft 36, by a differential of fluid pressures acting on the respective pole faces, or by a combination of these means. In order to assure satisfactory performance it is usually desirable that the pole pieces 32, 34 be centered with respect to their corresponding coils or windings 12, 14 so that as the spool member is translated to positions near the ends of the respective coils the induced voltage will maintain its value for a maximum length of travel.

The provision of the spaced annular members or "teeth" 16 which are designed to fit tightly around the coil form member 10 and to be in contact with the housing member 20 make it possible to substantially reduce the length of non-magnetic material in the magnetic path of the device. Were the annular washer-like members not used, the distance that the major portion of the magnetic flux must be maintained in non-magnetic material is approximately the radial depth of the coil plus the coil form member. By utilizing the "teeth" 16 of magnetic material, this length of non-magnetic gap is reduced to substantially the thickness of the coil form member 20. This results in a greatly decreased reluctance of the magnetic circuit and makes it possible to effect a substantial reduction in weight and size of the device compared with the conventional design.

The device of FIGURE 3 utilizes the advantages of the tooth feature and has as its innovation the substitution of a high permeability at high flux density alloy for the permanent magnet material of the movable spool. This substitution of material makes it possible to approximately double the flux density in the movable element. Linkages with turns and generated voltage will be correspondingly increased without an increase in the impedance of the winding. In the device of FIGURE 3, a coil form member 40 of non-magnetic material has wound thereon a pair of coils 42 and 44. Spaced at intervals between the individual turns of these respective coils or windings are a plurality of annular teeth or washer-like members 46 of magnetic material. Annular spacer members 47 of non-magnetic material are positioned between said teeth. The housing consists of a pair of generally cylindrical cover members 48, 50 of magnetic material arranged to abut against a centrally located annular permanent magnet member 52 which is magnetized axially. The movable member 54 may be a cylindrical member of cobalt iron alloy or other material that has a high permeability at high flux density and is adapted to be translated within the hollow interior of coil form member 40.

Operation of the devices of FIGURES 1 and 3 is essentially the same. The spool members 28 or 54 are adapted to be translated within the interior of their respective windings either as a result of being driven by an external member the position of which it is desired to control, or they may be otherwise controlled by means not within the scope of the present invention. Where used in an electrical servo system the voltage produced would normally be used as a feedback signal in conjunction with other signals to provide damping for said system. With no movement of the spool member, no voltage will be induced in the coils. As the spool member is translated, the number of linkages of flux loops with turns of a coil is changed and a voltage is induced which is of a polarity depending upon the direction of movement of the spool and of a magnitude depending upon the velocity of movement. It will be recognized that almost any desired function of linear velocity may be produced, because non-linear functions would result from winding the coils asymmetrically.

To decrease tooth-frequency ripple on induced voltage as a pole piece edge traverses from tooth to tooth, the pole faces on members 32, 34 (FIGURE 1) and on member 54 have been skewed so that points on their peripheries approach or leave a tooth at different times rather than all at the same time. It will be recognized that a number of possible configurations might be used to accomplish this desired result. This skew decreases changes in magnetic reluctance and decreases variations in counter magnetic force as the magnet spool moves. Another manner of decreasing tooth frequency ripple is to dimension the spool such that one pole piece may be centered on a tooth and the other centered midway between two teeth. This configuration tends to cancel a voltage valley by adding it to a peak when the two coils are in series.

While only two embodiments have been set forth herein, modifications may be made to suit the requirements of any particular application without departing from the scope of the present invention.

I claim:

1. A voltage generator comprising a cylindrical coil form member of non-magnetic material, a plurality of coils of wire wound on the outer periphery of said form member and electrically connected for additive generated voltages, a plurality of annular washer-like members of magnetic material spaced at intervals between the turns and extending to the outer periphery of said coils, and a plurality of annular coil retainer members in contact with the outside edges of said coils; a cylindrical cover member of magnetic material enclosing said coil form member and in contact with the outer edges of said washer-like and retainer members, and a spool adapted to reciprocate in the hollow interior of said coil form member containing a permanent magnet magnetized in an axial direction and a pole piece of magnetic material located on each end of said magnet, the external faces of said pole pieces being skewed so that as the spool is translated, points on the peripheries of the pole faces approach and leave positions adjacent any given annular tooth member at different times.

2. A voltage generator comprising a cylindrical coil form member of non-magnetic material, a plurality of coils of wire wound on the outer periphery of said form member and electrically connected for additive generated voltages, a plurality of annular washer-like members of magnetic material spaced at intervals between the turns and extending to the outer periphery of said coils, and a plurality of annular coil retainer members in contact with the outside edges of said coils; a cylindrical cover member of magnetic material enclosing said coil form member and in contact with the outer edges of said washer-like and retainer members, and a spool adapted to reciprocate in the hollow interior of said coil form member containing a permanent magnet magnetized in an axial direction and a pole piece of magnetic material located on each end of said magnet, said spool being dimensioned in relation to the position of said washer-like members such that one of said pole pieces may be centered substantially axially with respect to one of said members while the other of said pole pieces is centered axially substantially midway between two of said washer-like members.

3. A voltage generator comprising a cylindrical coil form member of non-magnetic material, at least one coil of wire wound on the outer periphery of said form member, a plurality of annular washer-like members of magnetic material spaced at intervals between the turns of said coil and extending to the outer periphery of said coil, a plurality of annular spacer members of non-magnetic material positioned between said washer-like members, and a plurality of annular members of magnetic material for retaining said coil in position; a cylindrical cover member of magnetic material enclosing said coil form member and in contact with the outer edges of said washer members and said retainer members; and a spool adapted to reciprocate in the hollow interior of said coil form member containing a permanent magnet magnetized in an axial direction and a pair of magnetic pole pieces, the outside faces of said pole pieces and said annular washer-like members being arranged in different planes whereby points on the peripheries of the pole faces approach and leave positions adjacent any given annular washer-like member at different times.

4. A voltage generator comprising a housing of magnetic material, a substantially cylindrical coil form member of non-magnetic material within said housing, a plurality of coils of wire wound on said coil form member and electrically connected for additive generated voltages, a plurality of annular members of magnetic material spaced at intervals between the turns of said coils, a spool member positioned within said coil form member and adapted to be moved linearly with respect thereto, and a permanent magnet operatively positioned within a magnetic circuit defined by said housing, annular members, and spool member, the ends of said spool member and said annular members of magnetic material being arranged in different planes whereby points on the peripheries of the spool member approach and leave positions adjacent any given annular member of magnetic material at different times.

5. A voltage generator comprising a cylindrical coil form member of non-magnetic material, a plurality of coils of wire wound on said coil form member and electrically connected for additive generated voltages, a plurality of annular members of magnetic material spaced at intervals between the turns of said coil, a housing member of magnetic material disposed in substantially coaxial relation with said coil and including an axially magnetized annular permanent magnet member, and a spool member of magnetic material adapted to be moved linearly within the interior of said coil form member, the ends of said spool member and the annular members of magnetic material being arranged in different planes whereby points on the periphery of the spool member approach and leave positions adjacent any given annular member of magnetic material at different times.

6. A voltage generator comprising a housing of magnetic material, a substantially cylindrical coil form member of non-magnetic material within said housing, a plurality of coils of wire wound on said coil form member and electrically connected for additive generated voltages, a plurality of annular members of magnetic material spaced at intervals between the turns of said coils, a spool member positioned within said coil form member and adapted to be moved linearly with respect thereto, and a permanent magnet operatively positioned within a magnetic circuit defined by said housing, annular members, and spool member, said spool member being dimensioned in relation to the position of said washer-like members such that one end of said spool member is effectively centered axially with respect to one of said members while the other end of said spool members is effectively centered axially midway between two of said washer-like members.

References Cited in the file of this patent

UNITED STATES PATENTS

| | | |
|---|---|---|
| 400,809 | Van Depoele | Apr. 2, 1889 |
| 450,543 | Van Depoele | Apr. 14, 1891 |
| 1,554,254 | Zbinden | Sept. 22, 1925 |
| 2,315,045 | Breitenstein | Mar. 30, 1943 |
| 2,591,921 | Cosgriff et al. | Apr. 8, 1952 |
| 2,842,688 | Martin | July 8, 1958 |

FOREIGN PATENTS

| | | |
|---|---|---|
| 93,413 | Switzerland | Mar. 1, 1922 |